UNITED STATES PATENT OFFICE.

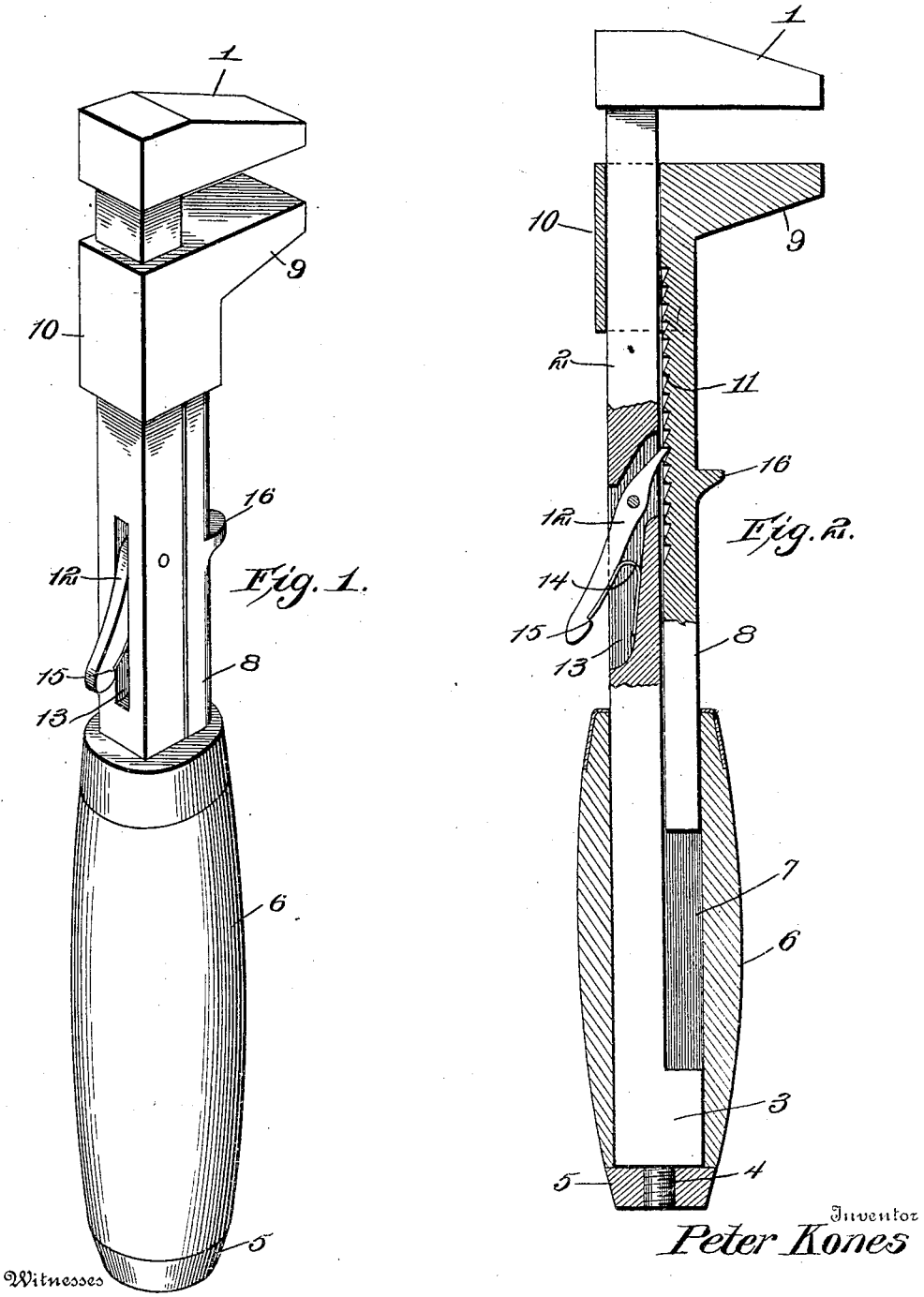

PETER KONES, OF CASTLEWOOD, SOUTH DAKOTA.

WRENCH.

No. 810,657.　　　Specification of Letters Patent.　　　Patented Jan. 23, 1906.

Application filed September 20, 1905. Serial No. 279,325.

*To all whom it may concern:*

Be it known that I, PETER KONES, a citizen of the United States, residing at Castlewood, in the county of Hamlin and State of South Dakota, have invented certain new and useful Improvements in Wrenches; and I do hereby declare the following to be a full, clear, and exact description of the invention, such as will enable others skilled in the art to which it appertains to make and use the same.

My invention relates to wrenches, and more particularly to that type of devices of this character for use upon nuts.

The object of the invention is to provide a sliding jaw having a shank which is slidably mounted upon the shank of the stationary jaw and which extends at all times into the handle, said sliding shank serving the purpose of a reinforce for the stationary shank, so as to prevent bending or breaking when subjected to unusual strain.

Another object is to provide novel means for locking the sliding jaw in adjusted position and additional means whereby the sliding jaw can be adjusted either forward or backward by the fingers of the hand holding the wrench.

With the above and other objects in view the invention consists of certain novel features of construction and combination of parts, which will be hereinafter fully described, and pointed out in the claim.

In the accompanying drawings I have shown the preferred form of my invention.

In said drawings, Figure 1 is a perspective view of my improved wrench; and Fig. 2 is a longitudinal section therethrough, the stationary shank being shown partly in section.

Referring to the figures by numerals of reference, 1 is a stationary jaw from which extends a shank 2. This shank has a lateral enlargement 3 adjacent one end, and a threaded stem 4 projects from said end of the shank and is adapted to receive a nut 5, whereby a grip 6 may be securely fastened upon the shank. This grip is hollow, and the recess or passage 7 formed therein is of such size as to receive the lateral enlargement 3, and when the shank 2 is secured within the passage sufficient space is left therein to receive a slidable shank 8, which extends from and is integral with the sliding jaw 9 of the wrench. This sliding jaw has an integral sleeve 10, which surrounds shank 2, and the end of its shank 8 is at all times within the passage 7 in grip 6. Shank 8 is arranged parallel and in contact with shank 2, and its inner face has a series of ratchet-teeth 11 formed therein, which are adapted to be engaged by a dog 12, which is pivoted within a passage 13, extending through shank 2. A bow-spring 14 is located within the passage 13 and bears upon the dog 12, so as to hold one end thereof normally in contact with the toothed face of shank 8. The outer end of the dog 12 has an integral shoulder 15, which serves to prevent the displacement of the spring 14 after the same has been properly inserted within passage 13. A lip 16 extends from shank 8 and is so located thereon that when the jaw 9 is opened to its greatest extent the lip 16 will be exposed close to the end of grip 6.

In using the wrench herein described the grip is held in one hand and the dog 12 is drawn inward by the first finger, so as to withdraw it from engagement with the ratchet-teeth 11. By holding the wrench vertically the sliding jaw 9 and its shank will then drop by gravity. Said sliding jaw can then be adjusted toward the fixed jaw 1 by pressing the thumb against lip 16, so as to move the shank 8 along shank 2 and cause teeth 11 to slip from the dog 12. It will be obvious that said dog will prevent the jaws from spreading apart as long as it engages one of the teeth 11. As the shank 8 extends from jaw 9 into the grip 6 it will greatly reinforce the shank 2 and will prevent the same from breaking or opening when subjected to unusual strain, as when a heavy nut is being tightened.

The wrench presents an attractive appearance, and considerable importance is attached to the fact that the same can be adjusted and manipulated by one hand.

Having thus fully described my invention, what I claim as new, and desire to secure by Letters Patent, is—

A wrench consisting of a fixed shank having a stationary jaw at one end and a grip at its other end said grip having a recess therein parallel with the fixed shank, a jaw slidably mounted upon the fixed shank, a movable shank extending from the slidable jaw and projecting longitudinally of the fixed shank and having teeth upon its inner face, a dog extending through the fixed shank and normally engaging the teeth on the movable shank, a shoulder upon the dog, a bow-spring within the recess and retained by the shoulder, said spring holding the dog normally in engagement with the teeth, said dog extending into close proximity to the grip and a thumb-piece upon the movable shank, said dog and thumb-piece extending in opposite directions from their shanks and adapted to be simultaneously engaged by members of a hand holding the grip.

In testimony whereof I have signed my name to this specification in the presence of two subscribing witnesses.

PETER KONES

Witnesses:
  BERT MORGAN,
  CAROLINE SHANKS.